Figure 1:
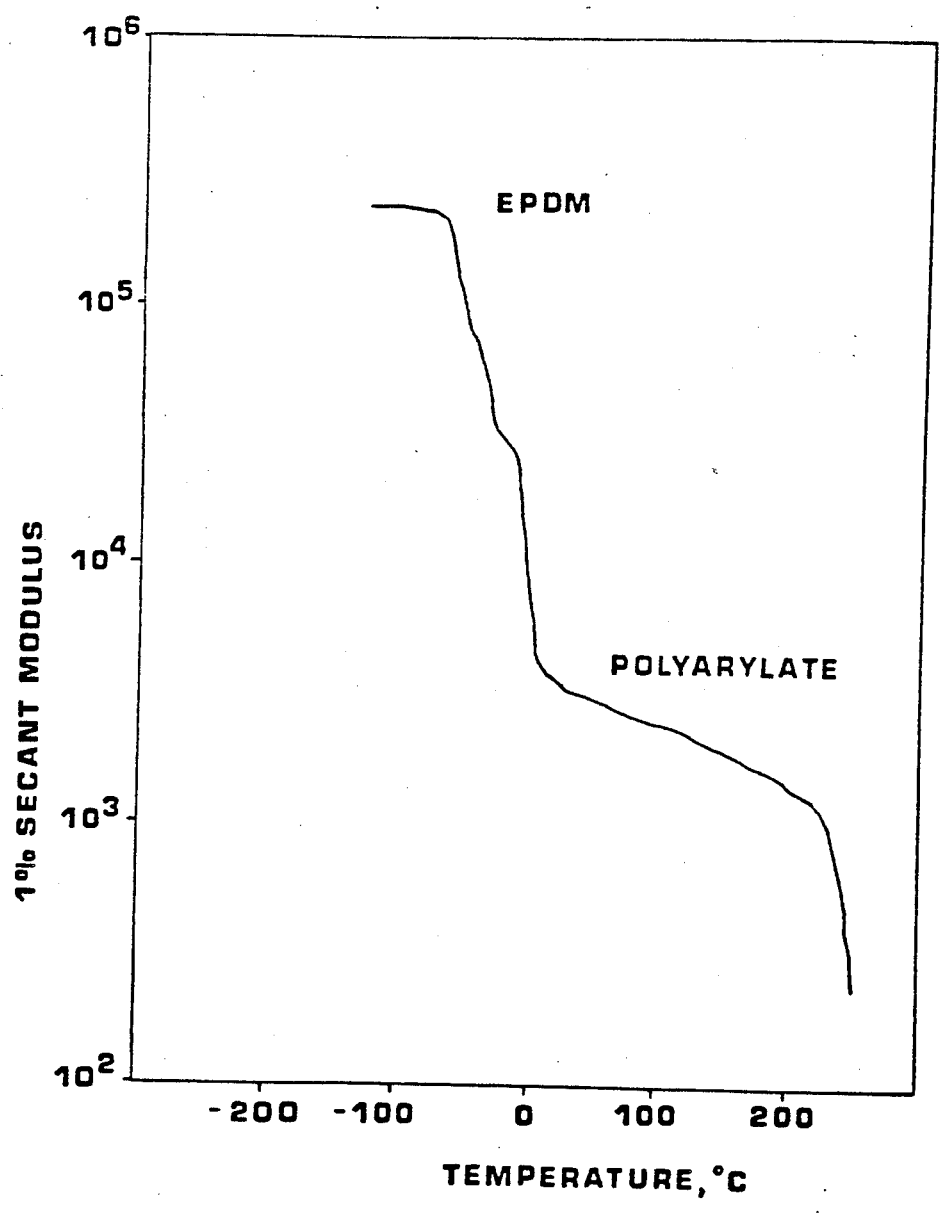

United States Patent [19]

Dean

[11] Patent Number: 4,937,287

[45] Date of Patent: Jun. 26, 1990

[54] ELASTOMERIC POLYARYLATE GRAFT COPOLYMERS

[75] Inventor: Barry D. Dean, Belle Mead, N.J.

[73] Assignee: Amoco Corporation, Chicago, Ill.

[21] Appl. No.: 156,728

[22] Filed: Feb. 17, 1988

[51] Int. Cl.$^5$ .................. C08G 81/02; C08G 81/00
[52] U.S. Cl. .................................... 525/152; 525/44; 525/132; 525/404; 525/408; 525/411; 525/444
[58] Field of Search .............. 525/152, 132, 44, 408, 525/411, 444, 404

[56] References Cited

U.S. PATENT DOCUMENTS

| | | | |
|---|---|---|---|
| 4,172,859 | 10/1979 | Epstein | 525/176 |
| 4,281,079 | 7/1981 | Baer | 525/152 |
| 4,324,869 | 4/1982 | Robeson | 525/132 |

FOREIGN PATENT DOCUMENTS 62-151449 7/1987 Japan ........................... 525/152

Primary Examiner—Patricia Short
Attorney, Agent, or Firm—Donald M. Papuga; William H. Magidson; Ralph C. Medhurst

[57] ABSTRACT

Novel thermoplastic elastomeric graft copolymers, formed via a cycloaddition reaction of an elastomer containing carbon-carbon double bonds with an aromatic polyether, end-capped with a 1,2-dihydroarylcyclobutenyl moiety, are described. The materials exhibit improved UV and thermal oxidative stability, attractive mechanical properties, and superior heat resistance. They are uniquely suited for impact modification of various thermoplastics such as polyesters, polyether imides, and the like.

5 Claims, 1 Drawing Sheet

ELASTOMERIC POLYARYLATE GRAFT COPOLYMERS

FIELD OF THE INVENTION

The present invention describes novel elastomeric graft copolymers. The compositions are formed via a cycloaddition reaction of an elastomer containing carbon-carbon double bonds, with an aromatic polyester end-capped with a 1,2-dihydroarylcyclobutenyl moiety. The grafting takes place by mixing and heating the coreactants in processing equipment either neat or in the presence of a processing aid.

The novel thermoplastic elastomers of this invention exhibit improved UV and thermal oxidative stability and superior heat resistance; they display attractive mechanical properties and are uniquely suited for impact modification of various thermoplastics such as other polyesters, polyetherimides, and the like.

BACKGROUND OF THE INVENTION

Polyarylates are aromatic polyesters derived from dihydric phenols and aromatic dicarboxylic acids. The material based on 2,2-bis(4-hydroxyphenyl)propane (bisphenol-A) and a 50:50 mixture of terephthalic and isophthalic acids (1) is offered commercially by Amoco Performance Products, Inc. under

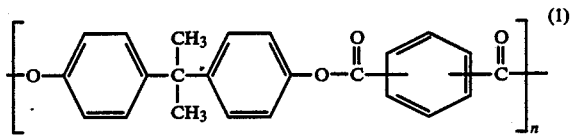

the tradename of ARDEL D-100®. Polyarylates are high temperature, high performance thermoplastic polymers with a good combination of thermal and mechanical properties. They display excellent UV resistance and have good processability which allows them to be molded into a variety of articles.

Polyarylates are high modulus, rigid thermoplastics; the incorporation of their outstanding properties into thermoplastic elastomers would be of great practical and scientific interest. It was now unexpectedly discovered that polyarylates having one terminal dihydroarylcyclobutene group per chain, react with unsaturated, low Tg polymers to give elastomeric materials displaying a combination of excellent mechanical and thermal properties. The scope of the reaction is outlined in the following section.

Polymers based on dihydroarylcyclobutenes have been mentioned in the literature. Thus, U.S. Pat. No. 4,540,763 describes the formation of thermosets by thermally reacting poly(dihydroarylcyclobutenes). Thermosetting materials may be formed via a similar reaction from bifunctional dihydrobenzocyclobutene-alkyne imide monomers, as shown in U.S. Pat. No. 4,675,370 and in the Journal of Polymer Sci., Polymer Chemistry 25, p. 3159 (1987); a related reaction, the formation of thermosetting polymers by heat-treating alkynyl-bridged poly(dihydroarylcyclobutenes), is claimed in U.S. Pat. No. 4,687,823. The formation of crosslinked products is also the subject of U.S. Pat. Nos. 4,687,815 and 4,708,994. Dihydrobenzocyclobutene end-capped styrene, diene, or styrenediene copolymers were shown to be capable of thermally induced coupling—see U.S. Pat. No. 4,708,990. Difunctional dihydroarylcyclobutenes, such as the 4,4'-ethylidene dihydrodibenzocyclobutene, were used successfully as crosslinking agents for ethylene-propylene-diene rubbers, as described in European Patent Application No. 227,163. Remarkably, however, there are no references teaching the use of dihydroarylcyclobutene chemistry for the preparation of thermoplastic graft copolymers.

THE INVENTION

It was now unexpectedly discovered that polyarylates having one dihydroarylcyclobutene group per chain are capable of reaction with low Tg ($\leq 0°$ C.) resins, containing from about one to about 20 mole percent of olefinic unsaturation, to give thermoplastic graft copolymers. The weight percent of the polyarylate in these novel materials may be in the range of from about 1 to about 99 percent. The preferred weight ranges of the aromatic polyester are about 65 to about 5 weight percent. At these low polyarylate contents the graft copolymers are thermoplastic elastomeric materials. They display improved UV stability, very good thermal oxidative stability, and excellent mechanical properties. In addition, they show improved impact modification efficiency and superior heat resistance.

The grafting reaction is illustrated in equation (I), wherein the dihydroarylcyclobutene is a dihydrobenzocyclobutene.

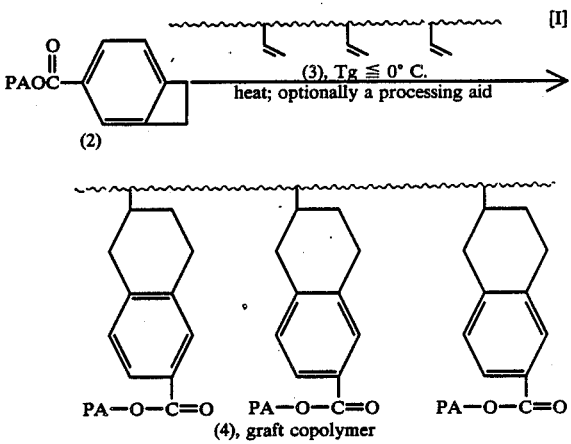

It is speculated that under the reaction conditions, the dihydrocyclobutene ring of (2) opens to give a highly reactive diene (5) (equation [II]). The latter then reacts with the double bonds of (3) via a Diels-Alder reaction and yields the graft copolymer (4). This is applicant's theory and applicant does not wish to be bound by it.

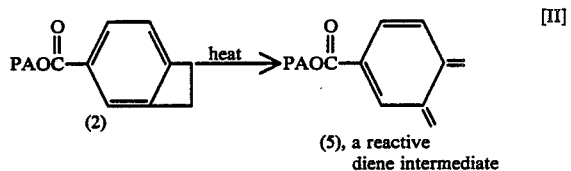

In the equations [I] and [II] PA stands for the aromatic polyester. It is attached to the dihydrobenzocyclobutene moiety via an ester linkage. Obviously, other linking groups are also feasible and are discussed below.

The graft structure (4) can be molded neat into a tough, high heat thermoplastic elastomer; or it may be physically added to aromatic polyesters, aliphatic-aromatic polyesters or other engineering thermoplastics as an impact modifier. It is, of course, also possible to prepare the graft copolymer in the presence of an engineering thermoplastic and, thus, produce the impact modified composition in one step.

The aromatic polyesters useful in the instant invention are based on (a) at least one dihydric phenol of the formula

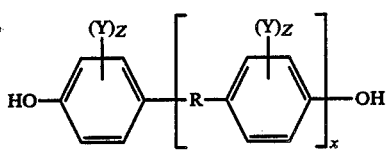
(6)

where Y is independently selected from alkyl groups of 1 to 4 carbon atoms, chlorine or bromine; Z independently has a value of from 0 to 4, inclusive, and R is independently selected from a divalent $C_6$ to $C_{20}$ aromatic or saturated aliphatic hydrocarbon radical, particularly alkylene or alkylidene radicals having from 1 to 8 carbon atoms, especially $C(CH_3)_2$, cycloalkylene, or cycloalkylidene radicals having up to and including 9 carbon atoms, O, S, SO, $SO_2$, CO and a chemical bond, x is 0 or 1; and (b) at least one aromatic dicarboxylic acid.

The dihydric phenols that may be used in this invention include the following:
2,2-bis(4-hydroxyphenyl)propane,
bis-(2-hydroxyphenyl)methane,
bis-(4-hydroxyphenyl)methane,
bis-(4-hydroxy-2,6-dimethyl-3-methoxyphenyl)methane,
1,1-bis(4-hydroxyphenyl)ethane,
1,2-bis(4-hydroxyphenyl)ethane,
1,1-bis-(4-hydroxy-2-chlorophenyl)ethane,
1,1-bis-(3-methyl-4-hydroxyphenyl)ethane,
1,1-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)-1,2-bis-(phenyl)-propane,
4,4'-(dihydroxyphenyl)ether,
4,4'-(dihydroxyphenyl)sulfide,
2,2-bis-(4-hydroxy-3,5-dichlorophenyl)propane,
4,4'-(dihydroxyphenyl)sulfone,
4,4'-(dihydroxyphenyl)sulfoxide,
4,4'-(dihydroxybenzophenone), and 4,4'-biphenol.

In addition, diphenols such as hydroquinone, and the naphthalene diols are also useful.

These dihydric phenols may be used individually or in any combination which when reacted with an aromatic dicarboxylio acid or mixtures thereof produces polyarylate polymers and copolymers that are soluble in inert organic solvents as hereinbelow defined. The preferred dihydric phenol is 2,2-bis(4-hydroxyphenyl)propane.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl groups contains from 1 to about 4 carbon atoms, and acids containing other inert substituents such as halides, alkyl or aryl ethers, and the like. Preferably, mixtures of isophthalic and terephthalic acids are used. The isophthalic acid to terephthalic acid ratio in the mixture is about 20:80 to about 100:0, while the most preferred acid ratio is about 25:75 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylates of the instant invention are preferably produced by the acid chloride process. Two procedures are useful. One is carried out at low temperature and the other at high temperature. In the low temperature technique, polycondensation of the aromatic acid chloride with the dihydric phenol is effected at ambient temperatures in an inert solvent, such as methylene chloride, in the presence of a basic catalyst and an acid acceptor. This type of process is described in, for example, U.S. Pat. No. 3,234,168. The condensation may also be performed in the presence of an inorganic acid acceptor, such as $Ca(OH)_2$ suspended in an inert organic solvent, as described in U.S. Pat. No. 3,939,117. A second, immiscible solvent, e.g., water, may be present in these low-temperature reactions. This process variant is referred to as the interfacial or phase boundary polymerization. In the interfacial reaction the phenolic components are dissolved in an aqueous alkaline phase. Small quantities, e.g., 0.1 to 1.0 percent by weight (based on the phenolic materials used) of reducing alkaline substances, such as sodium bisulfite for example, may be added to the aqueous phase. Quarternary ammonium or phosphonium compounds, in amount ranging from about 0.5 to about 5.0 mole percent based on the phenolic components, may be used as the polymerization catalysts. The acid chlorides are dissolved in the organic solvent and the solution is brought into contact with the aqueous alkaline solution which contains the phenolates. The two phases are vigorously stirred and polymer formation occurs at the interface. Preferred solvents for the low-temperature polymerization include methylene chloride, chloroform, tri- and tetrachloroethylene, tetrachloroethane, chlorobenzene, dichlorobenzene, tetrahydrofuran, and mixtures of these solvents. Temperatures are generally in the range of from about 0° to about 40° C., preferably in the range of from about 15° to about 30° C.

The high-temperature acid chloride process involves the condensation reaction at elevated temperatures (>100° C.) in high boiling solvents. The reactions may be performed in the absence of catalysts, in which case temperatures in excess of 200° C. are preferred. The polycondensations may also be catalyzed, for example with magnesium, as described in U.S. Pat. No. 3,733,306 and by Matzner and Barclay, J. Appl. Polymer Sci., Vol. 9, pp. 3321–3336 (1965). Another class of catalysts are, for example, the titanate esters described in German Patent Application No. 1,933,657. Lower temperatures are satisfactory for the catalyzed reactions and are generally in the range of about 110° C. to about 220° C., although higher temperatures may be necessary in some instances.

Inert, high boiling solvents which can be used in the high temperature process are those that do not react with the starting materials or with the final polyester. Also, the solvents should dissolve the polyarylate formed. Representative solvents include the chlorinated aromatic hydrocarbons such as chlorobenzene, dichloro-, trichloro-, and tetrachlorobenzenes, chlorinated biphenyls or diphenyl ethers, chlorinated naphthalenes; as well as non-chlorinated aromatics such as anisole, nitrobenzene, ditolylmethane, terphenyl, benzophenone, the dibenzylbenzenes, and the like.

In order to ensure the required dihydroarylcyclobutene termination, i.e., one end-group per polyarylate chain, the polycondensation reaction is preferably performed in the presence of an appropriate dihydroarylcyclobutene derivative. The latter must be capable of reaction with either the hydroxyl group or the acid chloride group. The dihydroarylcyclobutene derivatives that may be used are, for example, (7), (8) or (9). It is, of course, also possible to prepare the polyarylate first and then end-cap it with the arylcyclobutene moiety.

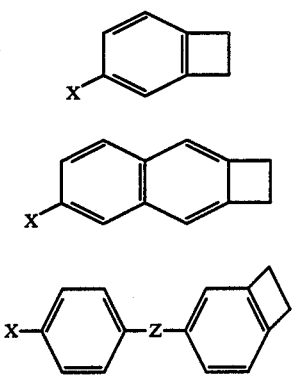

In the formulae above Z is selected from the group of O, SO, $SO_2$, CO, S—S, S, $C_1$ to $C_9$ alkylene, $C_1$ to $C_9$ alkylidene, $C_5$ to $C_9$ cycloalkylidene, $C_5$ to $C_9$ cycloalkylene, or a chemical bond; X is HO, HS, $NH_2$, COCl, OCOCl, or NCO.

Methods whereby these cyclobutene derivatives can be prepared are discussed in the sections that follow.

The variant whereby the polyarylate is prepared first and then reacted with an appropriately functionalized arylcyclobutene derivative, is desirable in those instances where high temperature, especially high temperature bulk processes, are used for the synthesis of the polyarylate segment. The high temperature solution processes were discussed before. Two bulk processes are also known, i.e., the diacetate process and the diphenate process.

The diacetate process consists in the reaction of aromatic diacids with diesters of the dihydric phenols, i.e., derivatives of the formula

R″COOAr₁OCOR″ (9a)

where R″ is, for example, a $C_1$ to $C_{10}$ aliphatic group, and $Ar_1$ is the residuum of the dihydric phenol. Thus, the polymerizations using the diacetate process require first the preparation of a diester of the dihydric phenol with a monocarboxylic acid. In principle, any monocarboxylic acid can be used; aliphatic acids containing from two to eleven carbon atoms are preferred; most preferred are $C_2$ to $C_4$ aliphatic acids. The esters (9a) are then reacted under acidolysis conditions with the dicarboxylic acid or mixtures of dicarboxylic acids; the reaction yields the polyarylate and the monocarboxylic acid, which can be recycled. The two steps, i.e., the preparation of the monocarboxylic acid esters (9a), and their polymerization, can be performed separately, or in a one-pot procedure. It is preferred that the intermediate diesters contain ≦ than about 1,500 parts per million of residual acid anhydride prior to polymerization. This procedure, as described in U.S. Pat. No. 4,321,355, yields polyarylates having good color and melt-stability. The acidolysis reaction can be performed in bulk or in the presence of from about 10 to about 60, more preferably from about 25 to about 60, and most preferably, from about 30 to about 60 weight percent, based on the weight of the polyarylate produced, of a processing aid. The preferred processing aids are a diphenyl ether compound as described in U.S. Pat. Nos. 4,294,956 and 4,296,232; a cycloaliphatic substituted aromatic or heteroaromatic compound, as described in U.S. Pat. No. 4,294,957; and a halogenated and/or etherated substituted aromatic or heteroaromatic compound as described in U.S. Pat. No. 4,374,239. The polymerization reaction can also be conducted using a slurry process as described in U.S. Pat. No. 4,083,829.

The acidolysis reactions are carried out in the temperature range of about 200° C. to about 350° C.; preferably in the temperature range of about 250° to about 325° C. However, lower and higher temperatures may also be used. The reactions can be carried out at atmospheric or subatmospheric pressures; they can also be performed under pressures higher than atmospheric.

The acidolysis reaction generally does not require a catalyst. In some instances, however, the use of an appropriate catalyst may prove advantageous. Typical catalysts include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts, such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

In the diphenate process, a diaryl ester of an aromatic diacid, for example (9b),

where $Ar_2$ is a monovalent aromatic radical, is reacted with the dihydric phenol. The reaction yields the polyarylate and the phenol $Ar_2OH$, which cab be recycled. The group $Ar_2$ can be derived from any phenol; phenyl or tolyl groups are preferred. The polymerization is essentially an ester-interchange reaction; the two steps, i.e., the preparation of (9b) and their polymerization, may be performed separately on in a one-pot procedure.

The ester-exchange reaction can be performed in bulk or in the presence of from about 10 to about 60, more preferably from about 25 to about 60, and most preferably, from about 30 to about 60 weight percent, based on the weight of the copolyarylate produced, of a processing aid. The preferred processing aids are a diphenyl ether compound, a cycloaliphatic substituted aromatic or heteroaromatic compound, or a halogenated and/or etherated substituted aromatic or heteroaromatic compound as described in, for example, U.S. Pat. No. 4,459,384.

It is most preferred to use the diphenyl iso- and terephthalates. The ester-exchange reaction is generally carried out in the temperature range of 200° to 350° C. However, lower or higher temperatures may also be used. The reaction can be performed at atmospheric, reduced, or higher than atmospheric pressures. Catalysts, generally compounds containing metals such as the alkali and alkaline earth metals, cerium, manganese, cobalt, zinc, germanium, tin, antimony and bismuth, may be used to accelerate the polymeization. Examples of typical catalysts are the alkali metal phenoxides, hydroxides, and alkoxides.

It should be noted that it is preferred to add the cyclobutene compound to the polyarylate-forming reaction mixture rather than to react it in a separate step with a preformed polyester. The reasons for this preference are twofold. First of all, the end-capping of each polyarylate chain is much easier via this approach, and no excess of the cyclobutene material is required. In addition, one is able to control the molecular weight of the aromatic polyester by simply adjusting the amounts of say (7), (8), or (9) relative to the other reactants.

It is preferred that the reduced viscosity of the polyarylate be in the range of 0.3 to 1.10 dl/g as measured in chloroform, at 25° C., at a concentration of 0.5 g per 100 ml. However, higher and lower molecular weights are also useful.

Due to the propensity of the cyclobutene ring toward ring-opening reactions, it is preferred to prepare the end-capped aromatic polyesters via the low-temperature polycondensation reactions. The most preferred preparative method is the interfacial polymerization. If a high temperature process is used with simultaneous end-capping it should preferably be conducted below about 200° C. However, if the polyarylate is prepared via solution or bulk reactions utilizing temperatures in excess of 200° C., end-capping with an arylcyclobutene moiety must be performed in a separate step. To this end the polyarylate is dissolved in a solvent, preferably an aliphatic or aromatic chlorinated solvent, or an amide solvent such as N,N-dimethylformamide, N,N-dimethylacetamide or N-methylpyrrolidone,in which it is reacted under conditions, obvious to those skilled in the art, with a suitably terminated arylcyclobutene derivative. These reaction are preferably conducted at temperatures below about 200° C. so as to preserve the integrity of the cyclobutene ring.

Typical end-capping reactions include contacting an isocyanate, an acid chloride, or a chlorocarbonyloxy terminated arylcyclobutene compound with a polyarylate bearing a free hydroxyl end-group; contacting an amino, an isocyanato an acid chloride, or a chlorocarbonyloxy terminated arylcyclobutene with a polyarylate having a carboxyl end-group; or a hydroxy, mercapto or amino terminated arylcyclobutene with a polyarylate possessing an acid chloride end-group.

Thus, the dihydroarylcyclobutene end-capped polyarylates are of the general formula (9c)

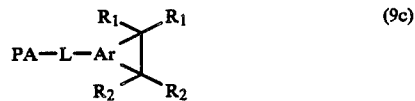

In the formula above PA is an aromatic polyester as previously defined; Ar, $R_1$ and $R_2$ are as hereinbelow defined; and the linking group L is selected from

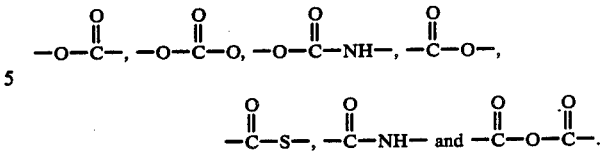

The dihydroarylcyclobutenes are of the general formula (14)

wherein X is as previously defined; Ar is a trivalent aromatic residue, two of the valencies being in positions ortho relative to each other. The group Ar

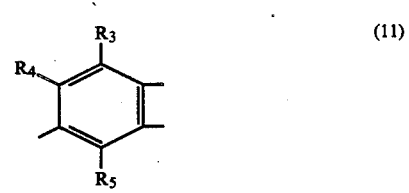

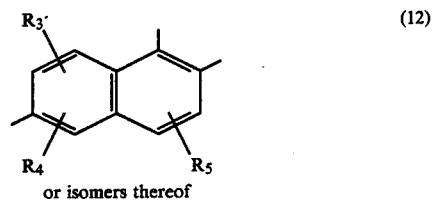

or isomers thereof

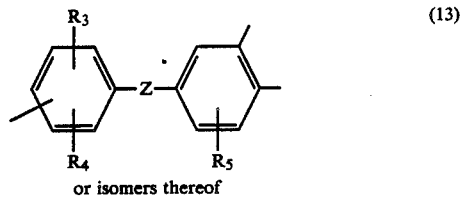

or isomers thereof is selected from (11), (12), or (13), where Z is as previously defined; $R_1$ and $R_2$ are independently H a $C_1$ to $C_8$ alkyl, a $C_6$ to $C_{20}$ aryl and a $C_5$ to $C_9$ cycloalkyl; the $R_1$'s or $R_2$'s may also form a ring; $R_3$, $R_4$, and $R_5$ are independently $R_1$ or $R_2$ and may also be halogen atoms. Dihydrobenzocyclobutenes (Ar=(11)) are preferred.

The poly(arylcyclobutene) monomers useful in this invention can be prepared by several synthesis schemes. The preferred methods of preparation of such monomers are described hereinafter.

In one synthesis scheme an alkyl-substituted aromatic compound which is further substituted with an alkoxycarbonyl group is chloroalkylated in a position ortho to the alkyl group. In the preferred embodiment wherein the aromatic compound is benzene, the starting material corresponds to formula (14), where $R_6$ is, for example, methyl or ethyl;

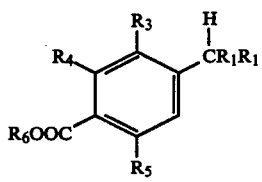

in the most preferred embodiment $R_3$, $R_4$, and $R_5$ are hydrogen atoms. Chloroalkylation of (14) ($R_3=R_4=R_5=H$) yields (15), where $R_1$ and $R_2$ are as previously defined.

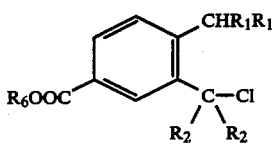

In this process the chloroalkylating agent is preferably chloromethyl methyl ether, although other chloroalkylating agents such as bis(chloromethyl) ether could be used. At least a 2:1 molar excess of the chloroalkylating agent to the alkyl-substituted aromatic compound is needed. It is preferable to use at least about a 3:1 ratio of chloroalkylating agent to alkyl aromatic compound. The catalyst is ferric chloride ($FeCl_3$) while the cocatalyst is thionyl chloride. The catalyst can be present in between about 0.05 to 1.0 mole per mole of alkyl aromatic. More preferably between about 0.1 and 0.4 mole of catalyst are present for each mole of alkyl aromatic compound. Preferably between about 0.05 and 1.0 mole of thionyl chloride per mole of alkyl aromatic is used, more preferably between about 0.1 and 0.4 mole per mole of alkyl aromatic.

This process can be performed at a temperature of between about 40° C. and 80° C., preferably about 40° C. and 60° C. Below about 40° C., the reaction rate is low. The boiling point of some of the components of the reaction mixture starts at about 60° C.

This process can be performed by contacting the alkyl aromatic compound with the chloroalkylating agent, catalyst and cocatalyst in a suitable solvent. Suitable solvents include chlorinated hydrocarbon solvents. Thereafter the reaction mixture is heated to the appropriate temperature. The product can be recovered by quenching the reaction mixture with alcohols or water to inactivate the chloroalkylating agents remaining, stripping off the volatiles and washing out the catalyst with water. The product thereafter is recovered by distillation.

The ortho chloroalkylated alkyl aromatic compounds can be converted to aromatic compounds with cyclobutene rings fused thereto, by pyrolysis. This is achieved by contacting the ortho chloroalkylated alkyl aromatic compound with at least 2 times its weight of a suitable diluent, and thereafter passing the mixture through a reactor at a temperature of 550° C. or greater and a pressure of between about atmospheric and 25 mm of mercury. Suitable diluents are generally substituted aromatic compounds which are inert to the chloroalkylated alkyl aromatic compound and are stable at pyrolysis temperatures. Examples of suitable diluents are benzene, toluene, xylenes, chlorobenzenes, nitrobenzenes, methylbenzoates, phenyl acetate or diphenyl acetate. Preferred diluents are the xylenes. Preferable temperatures are between about 700° C. and about 750° C. In a preferred embodiment, the reaction mixture is passed through a hot tube packed with an inert material, for example, quartz chips or stainless steel helices. The product can be recovered by distillation.

When $R_1$ and $R_2$ are H, the product obtained from (15) has the formula (16)

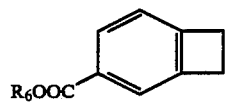

For simplicity purposes, all further synthesis descriptions will use structure (16). It is understood, however, that these considerations are equally applicable to the preparation of substituted derivatives of (16) as well as derivatives wherein Ar is (12) or (13).

The alkoxycarbonyl moiety of (16) can be converted to a carboxylate moiety by contacting (16) with at least a molar equivalent of alkali metal hydroxide in an alkanol-water solvent system. Thereafter, the carboxylate-substituted material can be converted to an acid chloride by contacting it with thionyl chloride and refluxing at 70° C. to 80° C.

An alternative preparation of (17) is shown in equation [III]:

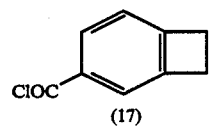

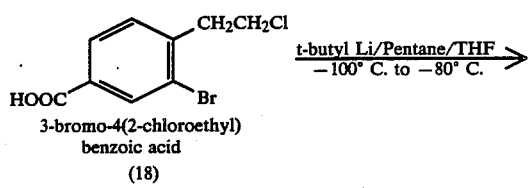

Yet another preparation of (17) is illustrated in equation [IV]:

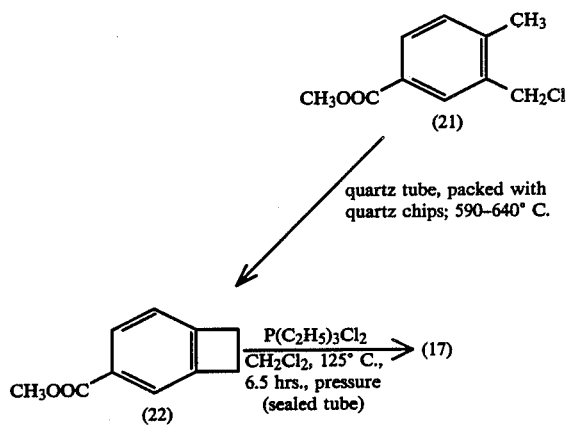

In still another synthetic method, an acryl compound with otrtho dibromomethyl groups can be converted to a 1,2-diiodoarylcyclobutene, by contacting the aryl compound substituted with ortho dibromomethyl moieties with an alkali metal iodide in an alkanol solvent at reflux so as to form the diiodoarylcyclobutenes. The product can be recovered by filtering, evaporating the filtrate and recrystallizing the product. In the embodiment wherein the aryl radical is a benzene radical, and wherein $R_1$, $R_2$, $R_3$, $R_4$ and $R_5$ are hydrogen atoms, the obtained iodobenzocyclobutene corresponds to the formula (23).

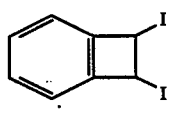

The 1,2-diiodoarylcyclobutenes, for example (23), can be converted to arylcyclobutenes by dissolving the 1,2-diiodoarylcyclobutenes in an alcohol solvent, preferably methanol or ethanol and contacting the solution with an alkali metal hydroxide in the presence of a palladium-on-carbon catalyst and $H_2$ gas at a temperature of 20° C. to 30° C. In general, at least between about 2 and 4 moles of alkali metal hydroxide per mole of 1,2-diiodoarylcyclobutene is used. Preferably, between about 50 and 200 psi of hydrogen gas is used. The arylcyclobutenes prepared in this manner can be recovered by distillation. Using the above method, compound (23) leads to material (24).

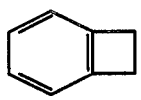

The arylcyclobutene, for example (24), can thereafter be brominated. In this process, the arylcyclobutene is dissolved in acetic acid and contacted with a brominating agent of pyridinium perbromide hydrobromide in the presence of mercuric salts, for example, mercuric acetate, at a temperature of between about 20° C. and 50° C. The brominated product can be recovered by extraction and distillation. The bromination of (24) gives the bromo derivative (25).

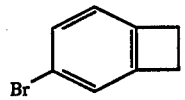

The brominated arylcyclobutene such as (25) for example, can thereafter be carbonylated to prepare a hydrocarbyloxy carbonyl-substituted arylcyclobutene. This carbonylation is achieved by dissolving the brominated arylcyclobutene in an alkanol solvent, and thereafter contacting the solution with carbon monoxide under pressure in the presence of a palladium catalyst, wherein the palladium is in the zero valence state, in the further presence of an acid accpetor under conditions such that the brominated arylcyclobutene compound undergoes carbonylation. Preferred catalysts are complexes prepared from palladium acetate and triphenyl phosphine, palladium triphenyl phosphine tetrakis, and bis(triphenyl phosphine) palladium chloride complex. The acid acceptor is generally a tertiary amine. In general, the reaction vessel is pressurized with carbon monoxide to a pressure of between atmospheric and 3000 psi. Preferred pressures are between 600 and 1000 psi.

This process is preferably performed at a temperature of between 100° C. and 140° C., most preferably between 120° C. and 130° C. The hydrocarbyloxy carbonyl arylcyclobutene can be recovered by filtering off the catalyst, washing away the acid scavenger with a 10 percent strong mineral acid solution, stripping off the solvent and distilling. The reaction is illustrated in equation [V] where $R_6$ is as previously defined.

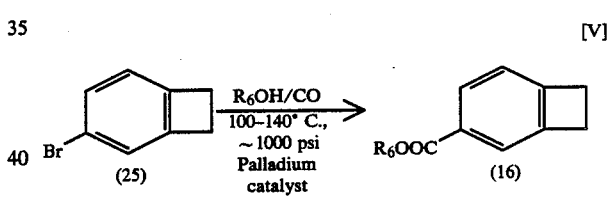

To prepare an amino substituted arylcyclobutene, a nitration of say (24) is performed using a cold solution of sodium nitrate to which is added concentrated sulfuric acid. The nitro compound is dissolved after isolation in ethanol and reduced by hydrogenation over a palladium on carbon catalyst (equation [VI]).

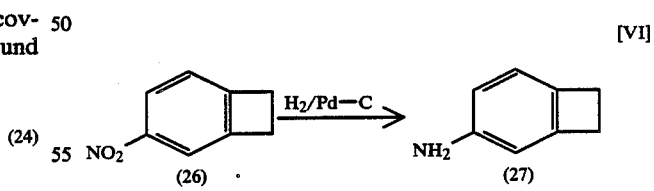

To prepare a hydroxy-substituted arylcyclobutene, an amine-substituted arycyclbutene is contacted with an alkali metal nitrite in the presence of sulfuric acid at 0° C., and thereafter the reaction mixture is heated to about 100° C. To prepare a chlorocarbonyloxy-substituted aryl cyclobutene. The hydroxy-substituted aryl cyclobutene is reacted with phosgene, preferably in the presence of a tertiary amine acid acceptor.

To prepare a mercapto-substituted arylcyclobutene, first an arylcyclobuten is reacted with chlorosulfonic acid to prepare an arylcyclobutene sulfonyl chloride.

Arylcyclobuteny sulfonyl chloride is reacted with zinc to prepare a mercapto-substituted arylcyclobutene. Alternatively, the arylcyclobutene is treated with a mixture of sulfur trioxide and dioxane at 0° C. followed by treatment with water. The arylcyclobutene-sulfonic acid is isolated and treated with phosphorous pentachloride for form the arylcyclobutene sulfonyl chloride which is then reduced with zinc to the mercapto-substituted arylcyclobutene.

To prepare the isocyanato-substituted arylcyclobutene, an amino-arylcyclobutene is reacted with phosgene using techniques that are well know to those skilled in the art.

Other methods, such as those described by skorcz and Kaminsky, Org. Synth., 48, pages 53-56 (1968), and Matsura et al., Bull. Chem. Soc. Japan 39, p. 1342 (1966) may also be used to prepare the subject arylcyclobutene derivatives.

The low Tg materials to which the arylcyclobutenyl end-capped polyarylate is grafted must satisfy two requirements:

(a) they must comprise carbon to carbon $\pi$ bonds either in the backbone or pendant to the backbone; and (b) their second order galss transition temperatures must be equal or less than 0° C.

The degree of unsaturation should generally be from about one to about 12 mole percent of unsaturation; most preferably the double bond content showld be from about 1.5 to about 6 mole percent.

The low Tg materials may be of several classes as listed below.

A. Olefin-Non-conjugated Diene Copolymers

Typically, an $\alpha$-olefin or a mixture of $\alpha$-olefins is copolymerized with at least one non-conjugated diene in the presence of, for example, a catalyst obtained by contacting an aluminum trialkyl with a vanadium compound. Such catalysts and copolymers have been described in, for example, U.S. Pat. Nos. 3,000,866; 3,063,973; 3,093,620; 3,093,621; 3,147,230; 3,154,528; and 3,260,708. Representative $\alpha$-olefins are ethylene, propylene, 1-butene, 1-hexene, 1-decene, 4-methyl-1-pentene, 1-heptene, 4-methyl-1-hexene, 5-methyl-1-hexene, 4,4-dimethyl-1-pentene, 6-methyl-1-heptene, 4-methyl-1-heptene, 5-methyl-1-heptene, 4,4-dimethyl-1-hexene, and 5,6,6-trimethyl-1-heptene.

Useful non-conjugated dienes include (i) dicyclopentadiene;

(ii) open chain aliphatic $C_6$ to $C_{22}$ dienes having the formula (28)

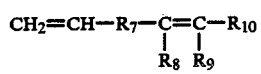

(28)

where $R_7$ is an alkylene radical, $R_8$ and $R_9$ are independently selected from a group consisting of hydrogen and alkyl radicals, and $R_{10}$ is hydrogen or an alkyl radical;

(iii) 5-alkenyl-substituted 2-norbornenes having the formula (29)

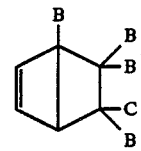

(29)

where B is hydrogen or $C_1$ to $C_6$ alkyl, and C is a monovalent alkenyl radical having an internal (non-terminal) carbon-to-carbon double bond;

(iiii) 5-alkylidene-2-norbornenes having the structure (30)

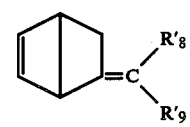

(30)

where $R'_8$ and $R'_9$ are H or alkyl radicals having a total between them of up to 16 carbon atoms; and (v) 2-alkyl-2,5-norbornadienes having the structure (31)

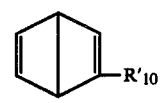

(31)

where $R'_{10}$ is a $C_1$ to $C_8$ alkyl radical.

Specific examples of non-conjugated dienes are 1,4-hexadiene;
9-octadecadiene;
6-methyl-1,5-heptadiene;
7-methyl-1,6-octadiene;
11-ethyl-1,11-tridecadiene;
9-ethyl-1,9-undecadiene;
7-ethyl-1,7-nonadiene;
8-propyl-1,8-undecadiene:
8-ethyl-1,8-undecadiene;
10-ethyl-1,9-dodecadiene;
12-ethyl-1,12-tetradecadiene;
13-n-butyl-1,12-heptadecadiene;
15-ethyl-1,15-heptadecadiene;
5-methylene-2-norbornene;
5-(2'-ethyl-2'-butenyl)-2-norbornene;
5-ethylidene-2-norbornene;
2-methyl-2,5-norbornadiene;
2-ethyl-2,5-norbornadiene;
2-isopropyl-2,5-norbornadiene;
2-(3-methylbutyl)-2,5-norbornadiene;
2-n-heptyl-2,5-norbornadiene;
2-n-heptadecyl-2,5-norbornadiene;
2-neopentyl-2,5-norbornadiene;
2-n-dodecyl-2,5-norbornadiene; and
dicyclopentadiene.

In addition, systems such as the adducts of copolymers of ethylene, at least one $C_3$ to $C_8$ $\alpha$-olefin and at least one non-conjugated diene, with maleic anhydride or other vinyl monomers are also useful. Materials of this type have been described—see, for example, U.S. Pat. No. 3,884,882.

B. Materials Based on Conjugated Dienes

A very broad range of butadiene- and/or isoprene-based materials can be used for the purposes of the instant invention. Thus, one may use polybutadiene;

styrene-butadiene random, graded block, and pure block copolymers; as well as the partially hydrogenated styrene-butadiene graded block and pure block copolymers. The above butadiene polymers and copolymers may contain from about 10 to about 20 mole percent of 1,2 vinyl groups. These rubbers are described in, for example, K. Sardelis et al., Polymer, Vol. 25, p. 1011 (1984). The diene-containing resins can be prepared by free-radical, anionic and Ziegler-Natta type processes—see, for example, U.S. Pat. Nos. 3,165,503; 3,254,062; 3,254,069; and 3,528,957. Copolymers of a variety of dienes with unsaturated monomers such as ethylene, propylene, 1-butene, isobutylene, 1-pentene, 1-hexene, 1-octene, styrene, vinyl cyclohexane and the like have been made using a trialkyl aluminum/titanium tetrachloride catalyst, as described in U.S. Pat. No. 3,165,503.

Also, particularly interesting are the so-called butyl rubbers synthesized by coreacting isobutylene with from about 1 to about 8 mole percent of isoprene. Various catalytic systems may be employed and comprise aluminum chloride, boron trifluoride, ethylaluminum chloride and titanium tetrachloride/t-butyl chloride. The products and processes are described in J. P. Kennedy, "Cationic Polymerization of Olefins: A Critical Inventory", John Wiley and Sons, New York, N.Y., 1975, pp. 86–140.

C. Acrylates

Copolymerization of allyl (meth)acrylate or of alkylene di(meth)acrylates with other addition monomers, such as styrene, $C_1$ to $C_{10}$ alkyl acrylate, butadiene, isoprene, and the like gives crosslinked rubber particles with pendant unsaturation. The resins are useful in preparing the grafted materials of the instant invention. The acrylate and methacrylate rubbers are generally made using suspension and emulsion techniques as described in U.S. Pat. Nos. 3,502,745 and 3,655,826.

D. Polyethers and Polyesters

Low Tg polyethers and polyesters with either pendant or in-chain unsaturation, such as the copolymers of propylene oxide with allyl glycidyl ether; polyesters from unsaturated diols, such as 2-butene-1,4-diol, and/or unsaturated dicarboxylic acids or anhydrides (e.g., maleic or tetrahydrophthalic anhydrides); polylactones with pending double bonds; and copolymers from lactones and unsaturated monomers such as vinyl epoxides, are yet another class of useful low Tg materials onto which the arylcyclobutenyl polyarylates can be successfully grafted. These unsaturated polyethers and polyesters are known. Thus, the copolymers from alkyl 1,2-epoxides and allyl glycidyl ethers were described in U.S. Pat. Nos. 3,135,705 and 3,135,706. The preparation of this type of materials using the system organoaluminum catalyst/water cocatalyst is claimed in U.S. Pat. No. 3,645,920.

The preceding description shows clearly that a very large number of unsaturated, low Tg polymers can be used for the preparation of the grafted products of the present invention. Materials of group A, i.e., the olefin/-non-conjugated diene copolymers, are preferred. Most preferred are the ethylene/-propylene/non-conjugated diene rubbers, wherein the diene is selected from the group of 1,4-hexadiene, dicyclopendatiene, 5-ethylidene-2-norbornene, 5-methylene-2-norbornene or their mixtures. The reduced viscosities of these rubbers, as measured in chlorobenzene at 25° (0.5 g/100 ml), are in the range of from about 1.0 to about 1.0 dl/g, corresponding to viscosity-average molecular weights of about 30,000 to about 70,000.

The preferred method of preparing the elastomer-g-aromatic polyester is physically mixing the elastomer and the end-capped aromatic polyester in the melt state at a temperature sufficient to promote the reaction between the 1,2-dihydrobenzocyclobutenyl end-group and the carbon-carbon double bond of the elastomer. The preferred temperature range is between 240° to 300° C. In addition to the two reactive polymer components, an inert processing solvent may be used to further promote phase contact between the two polymers. After the elastomer-g-aromatic polyester structure has been formed, the processing aid can be removed by such techniques as vacuum devolatilization. Typical inert, processing solvents are biphenyl, diphenyl ether, terphenyls, phenyl sulfone, 1-phenyl hexane, 1-phenyl heptane or 1-phenyl octane. The preferred processing solvent is diphenyl ether.

As indicated before, the graft copolymers of the instant invention display excellent mechanical and thermal properties. Moreover, as shown in the "Experimental", the 1,2-dihydroarylcyclobutenyl group displays an unexpected superior graft forming ability, as compared to that of an aliphatic conjugated diene, such as the 2,4-hexanedienoic acid end-group.

Quite unexpectedly, the thermoplastic elastomers described herein, are excellent impact modifiers for a variety of engineering polymers. Impact modified compositions, displaying very attractive properties, were obtained by blending the elastomers with polyarylates, with mixtures of polyarylates and poly(alkylene phthalates), polyarylate-co-poly(alkylene) phthalates, polycarbonates, poly(ester-carbonates), mixtures of polycarbonates and polyarylates, mixtures of polycarbonates and poly(alkylene phthalates), with polyetherimides and other high performance polymers. Generally, efficient impact modification is observed for polymers having a Tg of about $\geq 105°$ C.

The graft copolymers of the present invention exhibit a reduced viscosity of from about 1.0 to about 10.0, and preferably, from about 2.0 to about 6.0 dl/g, as measured in chlorobenzene, at 25° C., at a concentration of 0.5 g/100 ml.

The graft copolymers of this invention are also useful UV stabilizers for a variety of polymers, in particular for polyolefins such as polyethylene, polypropylene, ethylene/propylene copolymers, and the like.

The graft copolymers of the instant invention may include mineral fillers such as carbonates including chalk, calcite and dolomite; silicates including mica, talc, wollastonite; silicon dioxide, glass spheres, glass powders, aluminum, clay, quartz, and the like. Also, reinforcing fibers such as fiberglass, carbon fibers, and the like may be used. The polymers may also include additives such as titanium dioxide, thermal stabilizers, and the like.

The materials of this invention may be fabricated into any desired shape, i.e., molding, coatings, films, or fibers. They are also useful in blends with a variety of other polymers.

EXAMPLES

The following examples serve to give specific illustrations of the practice of this invention but they are not intended in any way to limit the scope of this invention.

EXAMPLE 1

This example demonstrates the preparation of 1,2-dihydro-4-chlorobenzoylcyclobutene using the sequence outlined in equation [III].

3-Bromo-4-(2-chloroethyl) benzoic acid (26.3 grams) available from Lancaster Synthesis was dissolved in tetrahydrofuran (200 milliliters) previously distilled from sodium. The solution was cooled to −100° C. with the aid of a liquid nitrogen bath and tertiary butyl lithium (2.7 molar; in pentane; Aldrich Chemical Co.) (75 mililiters) was added via syringe under nitrogen over a 10 minute period. The reaction mixture was held at −80° C. for 30 minutes then allowed to warm to 25° C. over a 2.5 hour time period. The reaction was quenched with 5 milliliters of 5 percent aqueous hydrochloric acid. The tetrahydrofuran solution was diluted with 350 milliliters of n-pentane (previously stirred over sulfuric acid). A white precipitate formed which was filtered, washed thoroughly with water and recrystallized from a water/ethanol (80/20) mixture. A white, crystalline solid (13.6 g, 92.1% yield) with a melting point of 87°–88.5° C. was recovered. Spectral analysis ($^{13}$C NMR, $^1$H NMR and IR) confirmed the structure as the carboxylic acid of 1,2-dihydrobenzocyclobutene.

The carboxylic acid derivative was converted to the corresponding acid chloride by refluxing with 1.4 equivalents of thionyl chloride. Once all of the acid had been converted to acid chloride (as monitored by liquid chromatography) the excess thionyl chloride was removed by vacuum distillation leaving a waxy solid. Recrystallization from petroleum ether yielded white platelets having a melting point of 42°–43.5 ° C. Elemental analysis confirmed the 1,2-dihydro-4-chlorobenzoylcyclobutene composition.

|  | Elemental Analysis | | |
| --- | --- | --- | --- |
|  | % C | % H | % Cl |
| Calculated | 64.88 | 4.24 | 21.28 |
| Found | 64.87 | 4.22 | 21.31 |

An alternative route to the 1,2-dihydro-4-chlorobenzoylcyclobutene (sequence of equation [IV]) is described below.

A 250 milliliter round bottom flask was equipped with a solid state addition funnel, a mechanical stirrer, a pressure equalizing addition funnel and a nitrogen purging system.

Methoxy acetyl chloride (12.5 grams) was dissolved in 60 milliliters of nitromethane and cooled to −35 ° C. with a dry ice/acetone bath. Aluminum trichloride (30.6 grams) was added as a fine powder over 20 minutes so as to maintain the reaction temperature at −30° C. to −25° C. Methyl 4-methyl benzoate (17.27 grams) was added dropwise over 15 minutes allowing the temperature to rise no higher than −20° C. The reaction mixture was stirred at −20° C. for one hour. Then the temperature of the reaction mixture was allowed to rise to 10° C. over one hour, at which point it was poured over 600 grams of crushed ice. The aqueous layer was extracted 3 times with 200 milliliters of diethyl ether. The diethyl ether layer was dried over anhydrous magnesium sulfate. The diethyl ether and nitromethane were removed under reduced pressure. The pale yellow oil which remained consisted of methyl 3-chloromethyl-4-methyl benzoate (81 percent, carbowax column) and methyl 4-methyl benzoate (19 percent, carbowax column).

The isolated yield of methyl 3-chloromethyl-4-methyl benzoate (vacuum distillation, bp=129°–131° C./0.5 mm) was 75 percent (based on methyl 4-methyl benzoate). The methyl 3-chloromethyl-4-methyl benzoate solidifies readily at ambient temperature (mp=46.5°–48° C.). The unreacted starting material, methyl 4-methyl benzoate, is easily separated from the desired reaction product as it has a bp=55°–57° C./1 mm.

$^1$H NMR(CDCl$_3$, δ); 2.41(3H,s); 3.87(3H,s); 5.01(2H,s); 6.94(1H,d); 7.11(1H,s); 7.23(1H,d).

|  | Elemental Analysis | | |
| --- | --- | --- | --- |
|  | % C | % H | % Cl |
| Calculated | 60.48 | 5.57 | 17.83 |
| Found | 60.41 | 5.49 | 17.81 |

The flash vacuum pyrolysis of the methyl 3-chloromethyl-4-methyl benzoate was conducted by dropwise addition of the molten methyl 3-chloromethyl-4-methyl benzoate (T=60° C.) into a quartz tube (37 cm in length, 2 cm internal diameter) packed with quartz chips heated by an electric furnace. The methyl 3-chloromethyl-4-methyl benzoate was added under a nitrogen stream from a pressure equalizing addition funnel connected to an angled elbow which serves as a preheating zone (heated to 280° C. by heating tape). The quartz tube exit was connected to a vacuum pump with two cold fingers, an HCl scrubbing bath and two dry ice traps in series. The temperature in the quartz tube was monitored by a thermocouple which extended to the outer wall of the quartz tube. Typically, the reaction zone temperature was between 590°–640° C. The products/unreacted starting materials collected on the cold finger were analyzed by gas chromatography and isolated by vacuum distillation. The reaction product/starting material mixture analyzed by gas chromatography for 49 percent of 1,2-dihydro-4-carbomethoxy benzocyclobutene, 43 percent methyl 3-chloromethyl-4-methyl benzoate and 8 percent of a byproduct tentatively identified as an oligomer of vinyl methyl benzoate.

$^1$H NMR(CDCl$_3$, δ); 3.11(4H,s); 3.87(3H,s); 6.98(1H,d); 7.12(1H,s); 7.19(1H,d).

$^{13}$C NMRCDCl$_3$, δ); 29.31; 29.47; 51.01; 122.51; 125.72; 136.72; 137.81; 146.62; 147.84; 167.21.

|  | Elemental Analysis | |
| --- | --- | --- |
|  | % C | % H |
| Calculated | 74.06 | 6.22 |
| Found | 73.94 | 6.17 |

The 1,2-dihydro-4-carbomethoxy benzocyclobutene was converted to the corresponding acid chloride derivative with dichlorotriphenylphosphorone.

1,2-Dihydro-4-carbomethoxy benzocyclobutene (5.1 grams) was charged along with 27.9 milliliters of a 1.13 m solution of dichlorotriphenylphosphorone in dichloromethane to a Diels-Alder tube. The solution was purged with nitrogen for 30 minutes, a magnetic stirrer was added and the tube capped. The Diels-Alder tube was heated with stirring to 125° C. for 6.5 hours, cooled to room temperature, then further cooled to −30° C. at which time the cap was removed allowing methyl chloride, a byproduct of the reaction, to escape. The contents of the reaction were transferred to a vacuum distillation unit and the 1,2-dihydro-4-chlorobenzoylcyclobutene was distilled (by 62.5°–63.5° C./5 mm) leaving the triphenyl phosphine oxide byproduct in the distillation flask.

¹HNMR 3.12(4H,s); 6.99(1H,d); 7.08(1H,s); 7.17(1H,d).

| | Elemental Analysis | | |
|---|---|---|---|
| | % C | % H | % Cl |
| Calculated | 64.88 | 4.64 | 21.28 |
| Found | 64.87 | 4.22 | 21.31 |

EXAMPLE 2

This example demonstrates the preparation of an aromatic polyester end-capped with the 1,2-dihydrobenzocyclobutenyl group.

A 500-milliliter three-neck round bottom flask was equipped with a mechanical stirrer, nitrogen inlet/outlet, a thermometer and a pressure equalizing addition funnel. The flask was charged with:
  7.8 grams of isophthaloyl dichloride;
  7.8 grams of terephthaloyl dichloride and
  0.6 grams of 1,2-dihydro-4-chlorobenzoylcyclobutene.

The acid chloride monomers were dissolved in freshly distilled dichloromethane (80 milliliters). The pressure equalizing addition funnel was charged with an aqueous solution from
  12.4 grams of sodium hydroxide;
  17.78 grams of 4,4'-isopropylidene diphenol and
  120 grams of deionized water.

The contents of the flask were cooled to 15° C. with an ice bath and 0.006 grams of benzyl triethylammonium chloride were added to the dichloromethane solution. The agitator was set to 300 rpm and the aqueous solution of the diphenolate was added at a rate so as to maintain the reaction temperature between 18°–20° C.

The aqueous solution was separated from the dichloromethane layer. The organic layer was washed with 5 percent acetic acid (aqueous), water, 5 percent bicarbonate (aqueous), and water. The transparent organic layer was poured into a 5-fold excess of isopropanol with agitation to coagulate the polymer.

The aromatic polyester exhibited a glass transition temperature (Tg) as measured by differential scanning calorimetry of 189° C. The reduced viscosity (RV) measured as a 0.5 weight percent chloroform solution at 25° C. was 0.68. The number average molecular weight (Mn) and weight average molecular weight (Mw) as measured by gel permeation chromatography versus mono-disperse polystyrene standards were 24,600 and 48,700, respectively.

Quantification of the 1,2-dihydrobenzocyclobutenyl end-groups was achieved by first reacting the polyarylate (5 grams) with maleic anhydride (5 grams) in 70 milliliters of diphenyl ether at reflux for one hour. The maleic anhydride undergoes a Diels-Alder reaction with the end group on the aromatic polyester thereby becoming chemically bound to the aromatic polyester terminus yielding a functionality which was readily titratable. The anhydride content was titrated potentiometrically in accordance with the procedure given in Polym. Bull., 16, p. 441 (1986). The RV before and after the maleic anhydride reaction remained within 0.01 dl/g of one another. In addition, a control was established to insure accurate end-group evaluation by refluxing the aromatic polyester in the absence of maleic anhydride.

In order to establish uniform end-capping reactivity the aromatic polyester (10 grams) was dissolved in 1,3,5,-triisopropylbenzene along with 2 grams of 1,1'-(methylene-4,1-diphenylene) bismaleimide and heated to reflux for 2 hours. The degree of chain extension as determined by RV and GPC measurements indicates the uniformity of end-capping. After reaction with the bismaleimide the RV=1.42, the Mn=49,100 and the Mw=87,500. Thus, the aromatic polyester appears to be uniformly end-capped with the 1,2-dihydrobenzocyclobutenyl grouping.

EXAMPLE 3

This example serves to demonstrate the formation of the elastomer-g-aromatic polyester and the thermoplastic elastomer properties attainable from the graft copolymers.

The general procedure for preparing the graft copolymers was as follows: to a Brabender mixing apparatus was charged the specified amount (Table I) of the end-capped aromatic polyester as prepared in Example 2, the specified amount the commercially available elastomer (Table I) and the processing solvent at a temperature >240° C. The contents of the Brabemder mixing bowl were held at temperature for 5 minutes at 100 rpm.

Physical property measurements were made on ⅛-inch strips shear cut from a molded sheet 4"×4"×0.020" after compression molding at 285° C.

The modulus versus temperature profile for the graft copolymer of Example 3-C is shown in FIG. 1.

TABLE I

| | A | B | C |
|---|---|---|---|
| Aromatic Polyester (APE,* Ex. 2) wt % | 15 | 35 | 50 |
| EPDM Elastomer** wt % | 85 | 65 | 50 |
| Processing Solvent wt % on (APE & EPDM) | 0 | 12 | 15 |
| Graft Analysis: | | | |
| RV(C₆H₅Cl, 25° C.) APE, Graft, EPDM | 0.68 | 0.68 | 0.68 |
| | 2.49 | 2.62 | 2.71 |
| | 2.17 | 2.17 | 2.17 |
| % APE* Extracted with CH₂Cl₂ | 2.5 | <1 | <1 |
| % EPDM** Extracted with Heptane | 4.2 | 1.8 | 1.5 |
| Tensile Strength (psi) (ASTM D-638) | 2,580 | 4,750 | 5,780 |
| Tensile Modulus (psi) (ASTM D-638) | 20,200 | 40,600 | 62,700 |
| Elongation at Break (%) (ASTM D-638) | 272 | 422 | 501 |
| Compression Set (%) 25° C., 100° C. (ASTM D-395) | 21, 34 | 5, 11 | 4, 9 |
| Tg (DSC) of Graft Copolymer | −55, 186 | −55, 189 | −53, 193 |

TABLE I-continued

|  | A | B | C |
|---|---|---|---|
| EPDM Component, APE Component | | | |

*APE = Aromatic polyester (i.e., Polyarylate).
**EPDM = Ethylene/Propylene/Diene rubber (1,4-hexadiene) Concentration of the 1,4-hexadiene = 4 weight percent.

EXAMPLE 4

This example serves to demonstrate the utility of the graft copolymers of this invention as impact modifiers for aromatic polyesters.

Ninety parts by weight of ARDEL D-100 polyarylate resin (polymer from bisphenol-A and a 50:50 mixture of isophthalic and terephthalic acids; structure shown by formula (1); sold by Amoco Performance Products, Inc.) and 10 parts by weight of the EPDM-g-aromatic polyester prepared in Example 3-B were combined in a Brabender mixing apparatus at 310° C. for 5 minutes at 100 rpm. The polymer blend was compression molded in a 4"×4"×0.020" mold at 320° C. and $\frac{1}{8}$-inch strips were shear cut for physical property measurements. The data in Table II contrasts the impact modified aromatic polyester with the unmodified aromatic polyester.

TABLE II

| | | |
|---|---|---|
| ARDEL D-100 | 100 | 90 |
| Graft Copolymer (Ex. 3-B) | — | 10 |
| Tensile Modulus (psi) | 224,000 | 223,000 |
| Elongation | | |
| Yield (%) | 10 | 19 |
| Break (%) | 21 | 44 |
| Pendulum Impact (ft-lbs/in$^3$) | 152 | 295 |
| Notched Izod (compression molded $\frac{1}{8}$" thickness specimen) | 3.1 | 7.4 |
| Total weight % Rubber in Composition | 0 | 6 |

EXAMPLE 5

This example serves to demonstrate the utility of the graft copolymers of this invention as impact modifiers for blends of aromatic polyesters and poly(ethylene terephthalate) where a random copolyester has been formed due to transesterification reactions.

Seventy-five parts by weight of ARDEL D-100 polyarylate resin and 25 parts by weight of Cleartuf 7202 poly(ethylene terephthalate) (PET) (Goodyear Chemical Co.) were combined in the Brabender mixing apparatus at 280° C. for 4 minutes at 100 rpm. The blend was transparent, exhibited a Tg (DSC) of 144° C. and an RV of 0.73 dl/g. Mechanical properties were assessed as in previous examples (see Table III).

A second blend comprising 88 percent by weight of the ARDEL D-100/Cleartuf 7202 (75/25) blend and 12 percent by weight of the elastomer-g-aromatic polyester (Example 3-C) was prepared in the Brabender mixing apparatus at 280° C. for 5 minutes at 100 rpm. The mechanical properties were assessed as in previous examples (see Table III).

TABLE III

| | | |
|---|---|---|
| ARDEL D-100/Cleartuf 7202 (75/25) | 100 | 80 |
| Graft Copolymer (Ex. 3-C) | — | 12 |
| Tensile Modulus (psi) | 247,000 | 243,000 |
| Elongation | | |
| Yield (%) | 11 | 17 |
| Break (%) | 26 | 54 |
| Pendulum Impact (ft-lbs/in$^3$) | 98 | 207 |
| Notched Izod (compression molded $\frac{1}{8}$" thickness specimen) | 2.1 | 9.4 |
| Total weight % Rubber in Composition | 0 | 6 |

EXAMPLE 6

This example serves to demonstrate the utility of the graft copolymers of this invention as impact modifiers for blends of an aromatic polyester and an aromatic polycarbonate where a random poly(ester-carbonate) has been formed due to transesterification.

Seventy-five parts by weight of ARDEL D-100 polyarylate resin and 25 parts by weight of Lexan® 101 polycarbonate (General Electric Company) were combined in the Brabender mixing apparatus at 310° C. for 5 minutes at 100 rpm. The blend was transparent, exhibited a Tg (DSC) of 170° C. and an RV of 0.69 dl/g. Mechanical properties were assessed as in previous examples (see Table IV).

A second blend comprising 88 percent by weight of the ARDEL D-100/Lexan 101 (75/25) blend and 12 percent by weight of the elastomer-g-aromatic polyester (Example 3-C) was prepared in the Brabender mixing apparatus at 310° C. for 5 minutes at 100 rpm. Mechanical properties were assessed as in previous examples (see Table IV).

TABLE IV

| | | |
|---|---|---|
| ARDEL D-100/Lexan 101 (75/25) | 100 | 88 |
| Graft Copolymer (Ex. 3-C) | — | 12 |
| Tensile Modulus (psi) | 251,000 | 247,000 |
| Elongation | | |
| Yield (%) | 19 | 24 |
| Break (%) | 27 | 38 |
| Pendulum Impact (ft-lbs/in$^3$) | 172 | 293 |
| Notched Izod (compression molded $\frac{1}{8}$" thickness specimen) | 4.2 | 8.3 |
| Total weight % Rubber in Composition | 0 | 6 |

EXAMPLE 7

This examples serves to demonstrate the utility of the graft copolymers of this invention as impact modifiers for polyetherimides.

Eighty-eight parts by weight of ULTEM 1000 polyetherimide of the formula:

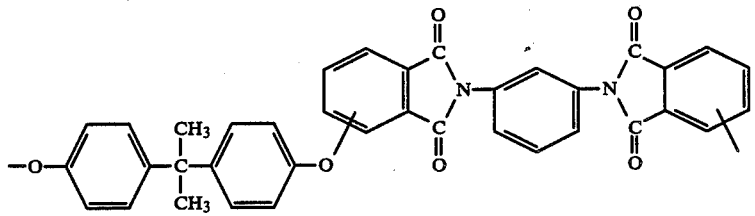

(sold by the General Electric Company) was melt mixed with 12 parts by weight of the elastomer-g-aromatic polyester (Example 3-C) in a Brabender mixing apparatus at 300° C. for 5 minutes at 100 rpm. The mechanical properties are shown in Table V.

TABLE V

| | | |
|---|---|---|
| ULTEM 1000 | 100 | 88 |
| Graft Copolymer (Ex. 3-C) | — | 12 |
| Elongation | | |
| Yield (%) | 7.2 | 8.6 |
| Break (%) | 8.7 | 19 |
| Pendulum Impact (ft-lbs/in³) | 16 | 94 |

EXAMPLE 8

This example serves to contrast the graft copolymer forming abilities of aromatic polyesters terminated with 1,2-dihydrobenzocyclobutenyl groups versus termination with an aliphatic conjugated diene such as 2,4-hexanedienoic acid (i.e., sorbic acid).

The aromatic polyester of this invention, termination with 1,2-dihydrobenzocyclobutenyl group, was prepared according to Example 2. The aromatic polyester terminated with 2,4-hexanedienoic acid was prepared according to Example 1 of U.S. Pat. No. 4,582,893. The data in Table VI contrast the two aromatic polyesters and their graft forming capability with EPDM rubber. Preparation of the graft polymers was accomplished in a Brabender mixing apparatus using 50 weight percent of the specified aromatic polyester and 50 weight percent of the Nordel 1500 EPDM rubber (2.1 weight percent of 1,4-hexadiene) at three temperatures, namely: 250° C., 275° C., and 300° C., each for 5 minutes, at 100 rpm. The data support the superior graft forming ability of the 1,2-dihydrobenzocyclobutenyl group.

TABLE VI

| | Aromatic Polyester (Example 2, This Invention) | Aromatic Polyester (Example 1, U.S. Pat. No. 4,582,893) |
|---|---|---|
| Tg (°C., DSC) | 189 | 190 |
| RV (dl/g)(CHCl₃, 0.5 g/100 ml., 25° C.) | 0.68 | 0.66 |
| EPDM Melt Blend: | | |
| 250° C. | | |
| % APE Extracted with CH₂Cl₂ | 2.5 | 64 |
| % EPDM Extracted with Heptane | 3.7 | 72 |
| 275° C. | | |
| % APE Extracted with CH₂Cl₂ | 1.6 | 81 |
| % EPDM Extracted with Heptane | 2.1 | 73 |
| 300° C. | | |
| % APE Extracted with CH₂Cl₂ | 1.8 | 76 |
| % EPDM Extracted with Heptane | 2.3 | 70 |

What is claimed is:

1. A thermoplastic graft copolymer comprising:
   (a) a backbone having a second order glass transition temperature (tg) of 0° C. or less, having a degree of unsaturation from about 1 to about 20 mole percent selected from the group consisting of olein-non-conjugated diene copolymers, conjugated diene homo- and copolymers, acrylate copolymers, polyethers and polyesters, and
   (b) polyarylate side chains; said polyarylate derived from:
      (i) at least one dihydric phenol selected from (a) the group of dihydric phenols of the formula:

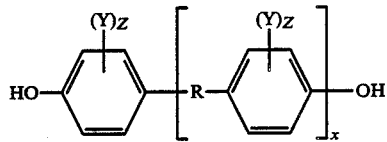

where Y is independently selected from alkyl groups of 1 to 4 carbon atoms, chlorine or bromine; z independently has a value of from 0 to 4 inclusive; and R is independently selected from a divalent $C_6$ to $C_{20}$ aromatic radical, a saturated $C_1$ to $C_8$ alkylene or alkylinene radical cycloalkylene or cycloalkylidene radicals of up to 9 carbon atoms, O, S, SO, $SO_2$, CO, and a chemical bond; X is 0 to 1; and/or (b) the group of naphthalene diols; and
      (ii) at least one dicarboxylic acid selected from the group consisting of terephthalic acid, isophthalic acid, the naphthalene dicarboxylic acids, and the $C_1$ to $C_4$ alkyl or halo substituted derivatives of these acids; said polyacrylate containing a dihydroarylcyclobutene group.

2. A graft copolymer as defined in claim 1 wherein the polyacrylate content is in the range of from about 65 to about 5 weight percent.

3. A graft copopolymer as defined in claim 1 wherein the backbone is a copolymer of ethylene, propylene, and a non-conjugated diene selected from the group of dicyclopentadiene, 1,4-hexadiene, 5-methylene-2-norbornene and 5-ethylidene-2-norbornene.

4. A graft copolymer as defined in claim 1 wherein the polyarylate is a polyester of 2,2-bis(4-hydroxyphenyl)propane and at least one aromatic dicarboxylic acid.

5. A graft copolymer as defined in claim 4 wherein the polyarylate is a copolyester of isophthalic and terephthalic acids and wherein the ratio of said acids is in the range of from about 20:80 to about 100:0.

* * * * *

UNITED STATES PATENT AND TRADEMARK OFFICE
CERTIFICATE OF CORRECTION

PATENT NO. : 4,937,287

DATED : June 26, 1990

INVENTOR(S) : Barry D. Dean

It is certified that error appears in the above-identified patent and that said Letters Patent is hereby corrected as shown below:

| Col. | Line | |
|---|---|---|
| 11 | 19 | "acryl" should read --aryl--. |
| 11 | 20 | "otrtho" should read --ortho--. |
| 12 | 59 | "arycyclbutene" should read --arylcyclobutene--. |
| 12 | 67 | "arylcyclobuten" should read --arylcyclobutene--. |
| 13 | 1 | "Arylcyclobuteny" should read --Arylcyclobutenyl--. |
| 13 | 30-31 | "The degree of unsaturation should generally be from about one to about 12" should read --The degree of unsaturation should generally be from about one to about 20 mole percent. It is preferred to have from about one to about 12--. |

UNITED STATES PATENT AND TRADEMARK OFFICE
CERTIFICATE OF CORRECTION

PATENT NO. : 4,937,287

DATED : June 26, 1990

INVENTOR(S) : Barry D. Dean

It is certified that error appears in the above-identified patent and that said Letters Patent is hereby corrected as shown below:

| Col. | Line | |
|------|------|---|
| 15 | 68 | "1.0 dl/g" should read --10.0 dl/g--. |
| 20 | 45 | "Brabemder" should read --Brabender--. |
| 24 | 21 | "olein" should read --olefin--. |
| 24 | 42 | "alkylinene" should read --alkylidene--. |

Signed and Sealed this

Twenty-first Day of January, 1992

Attest:

HARRY F. MANBECK, JR.

*Attesting Officer*     *Commissioner of Patents and Trademarks*